No. 804,181. PATENTED NOV. 7, 1905.
E. H. AHLANDER.
PRINTING PRESS.
APPLICATION FILED NOV. 28, 1903.
10 SHEETS—SHEET 5.
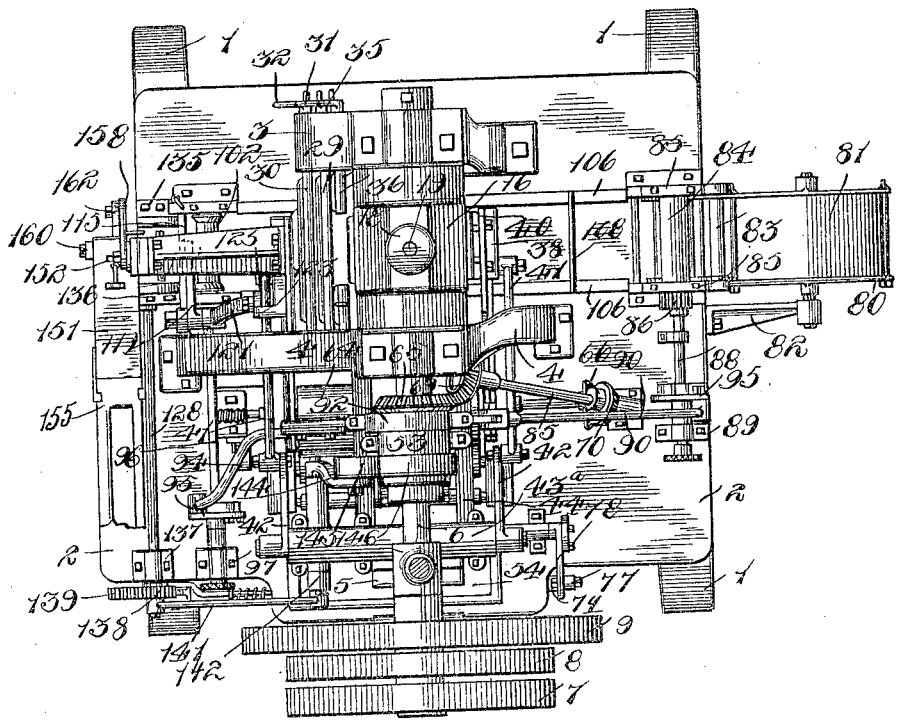

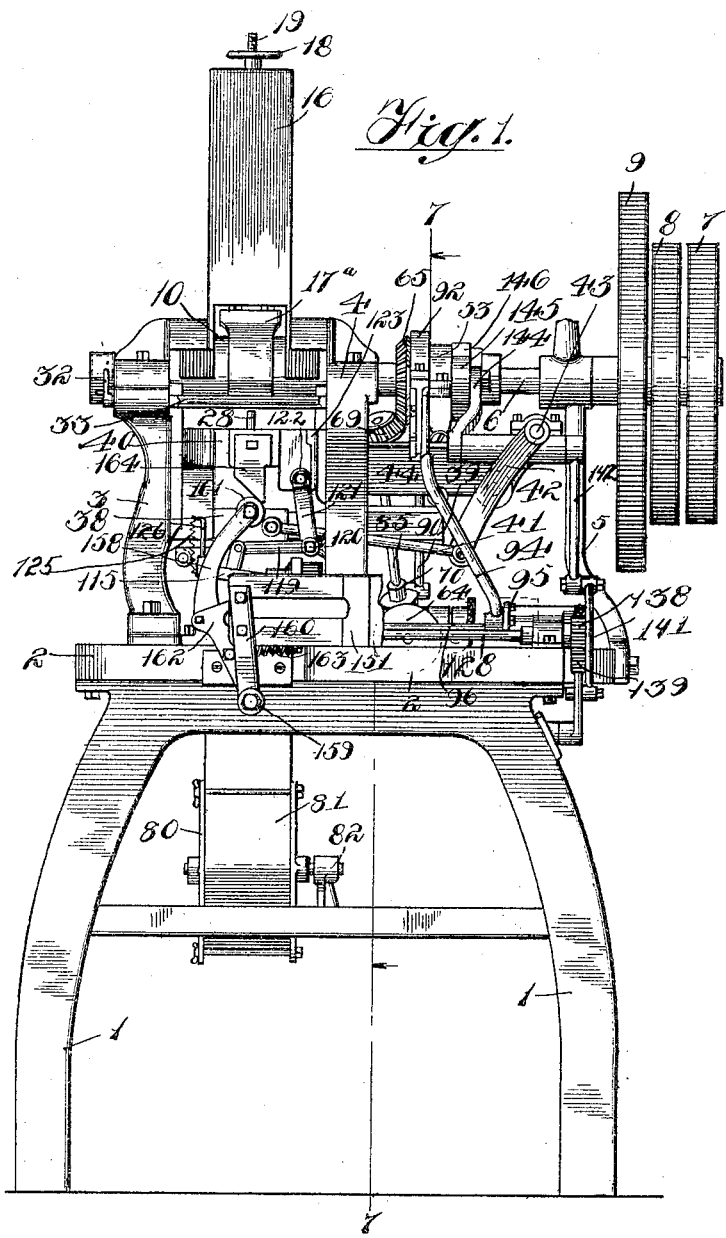

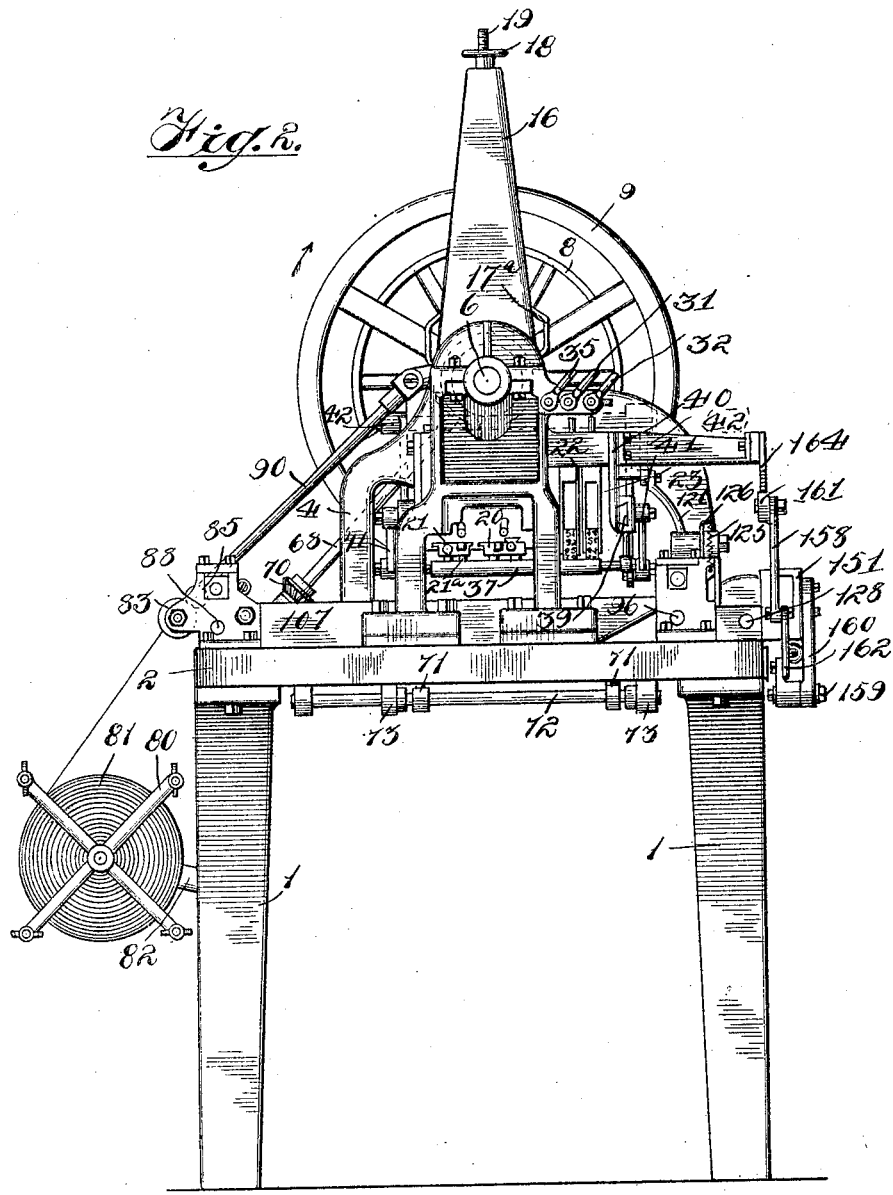

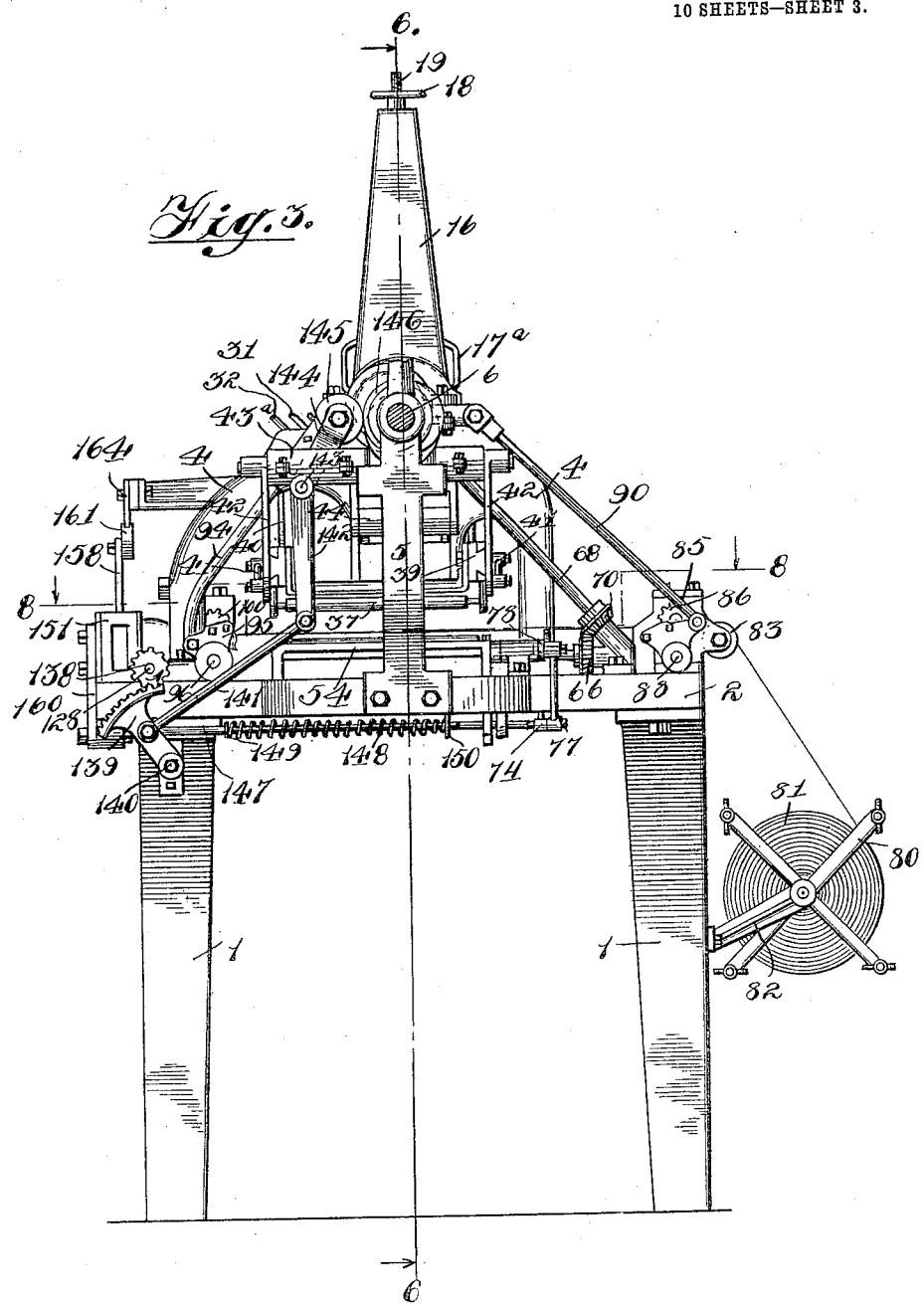

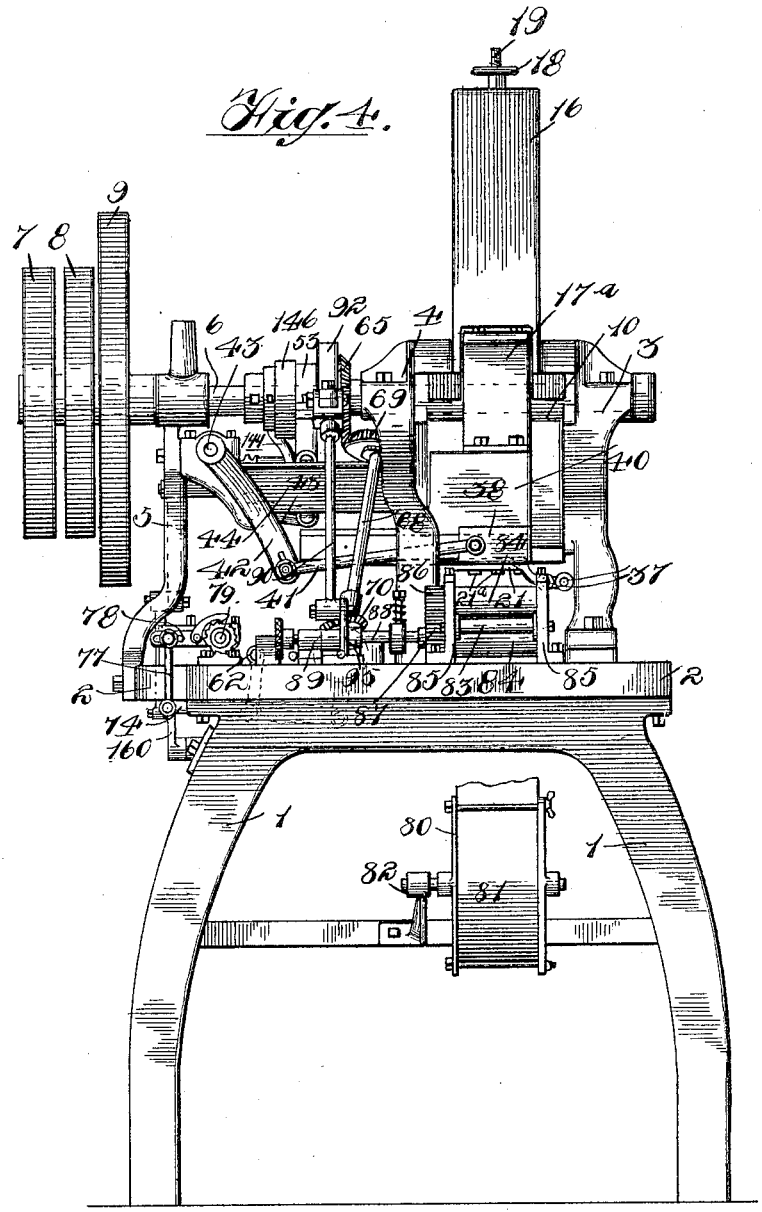

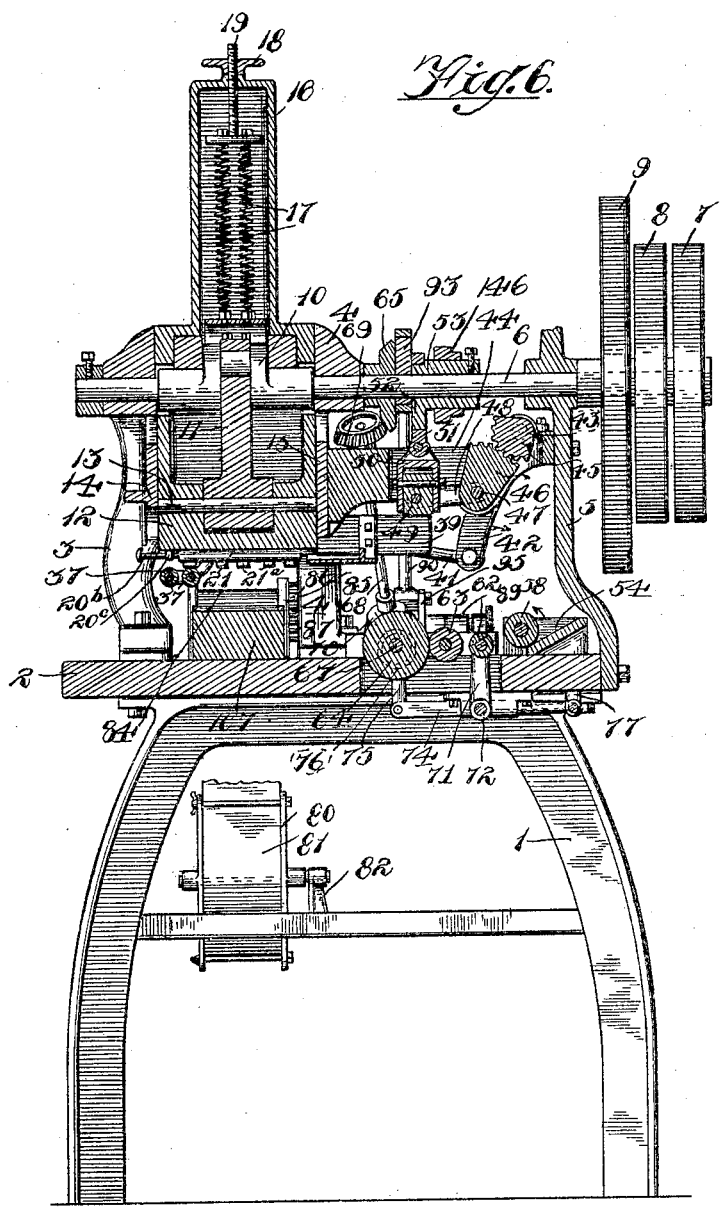

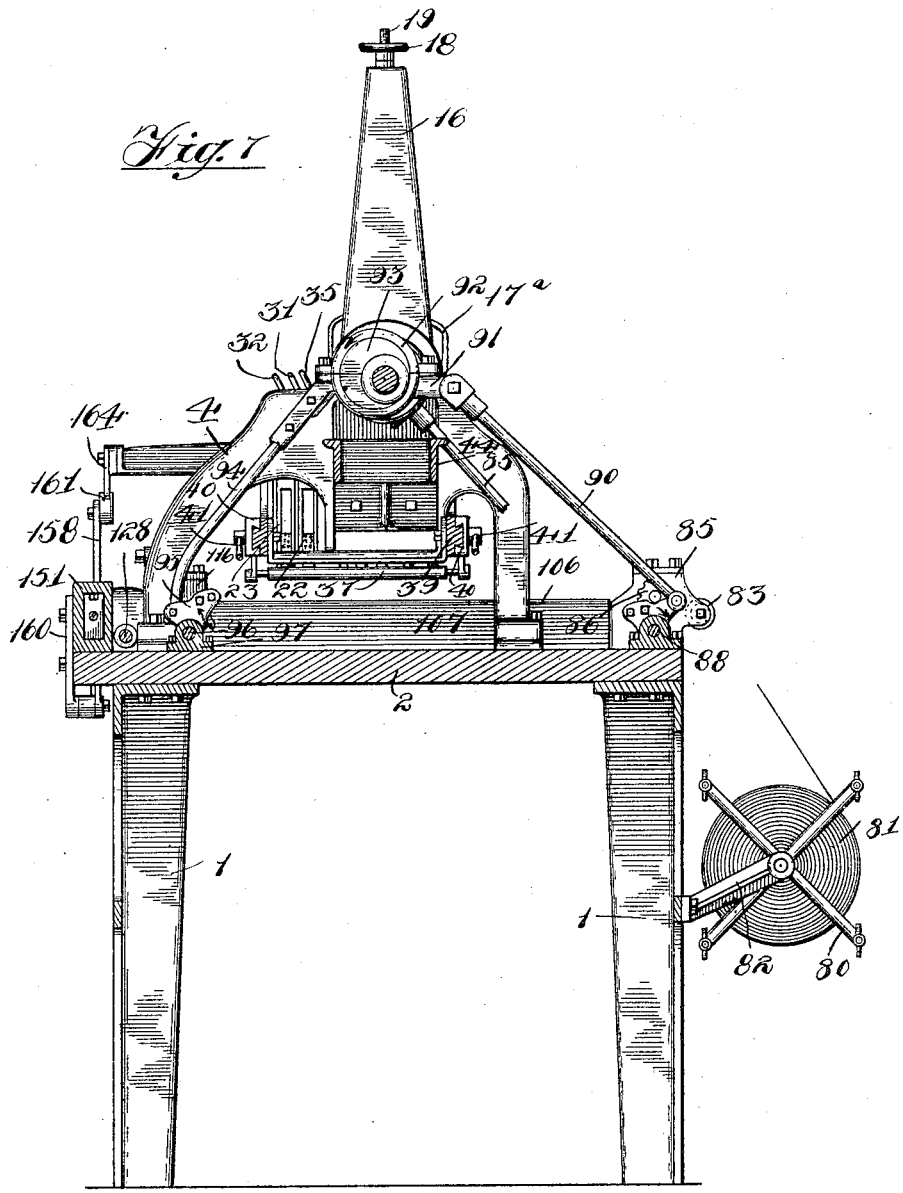

No. 804,181. PATENTED NOV. 7, 1905.
E. H. AHLANDER.
PRINTING PRESS.
APPLICATION FILED NOV. 28, 1903.
10 SHEETS—SHEET 8.
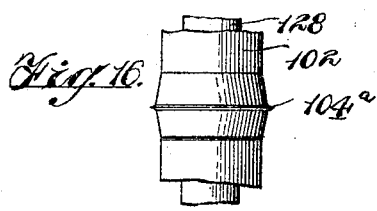
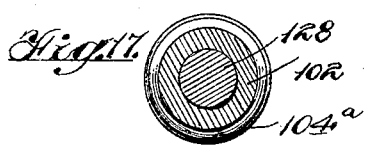
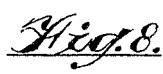
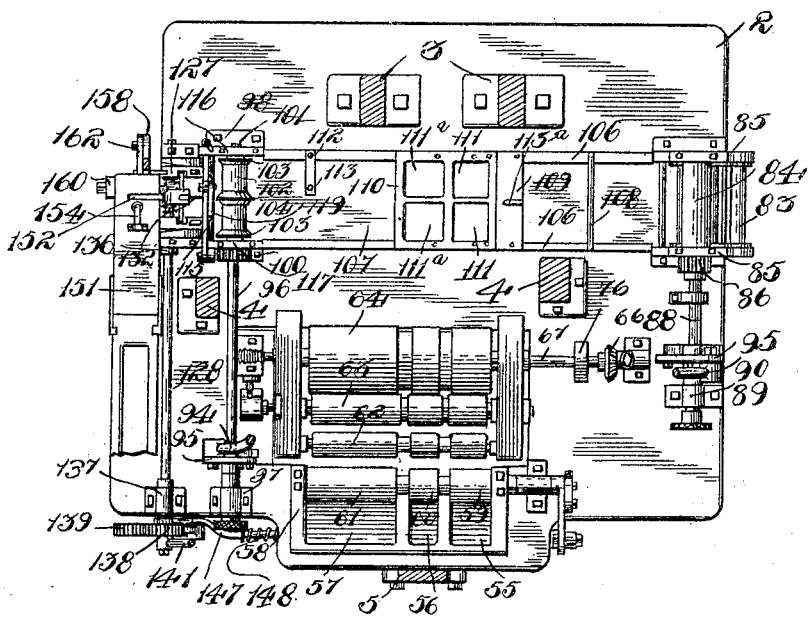
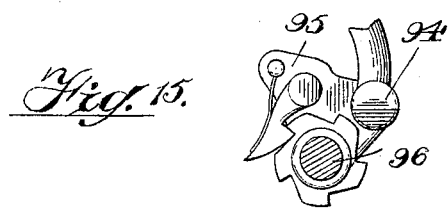
Witnesses:
G. V. Domarus
Robert H. Weir
Inventor:
Ernst H. Ahlander
By A. Miller Belfield
Attorney

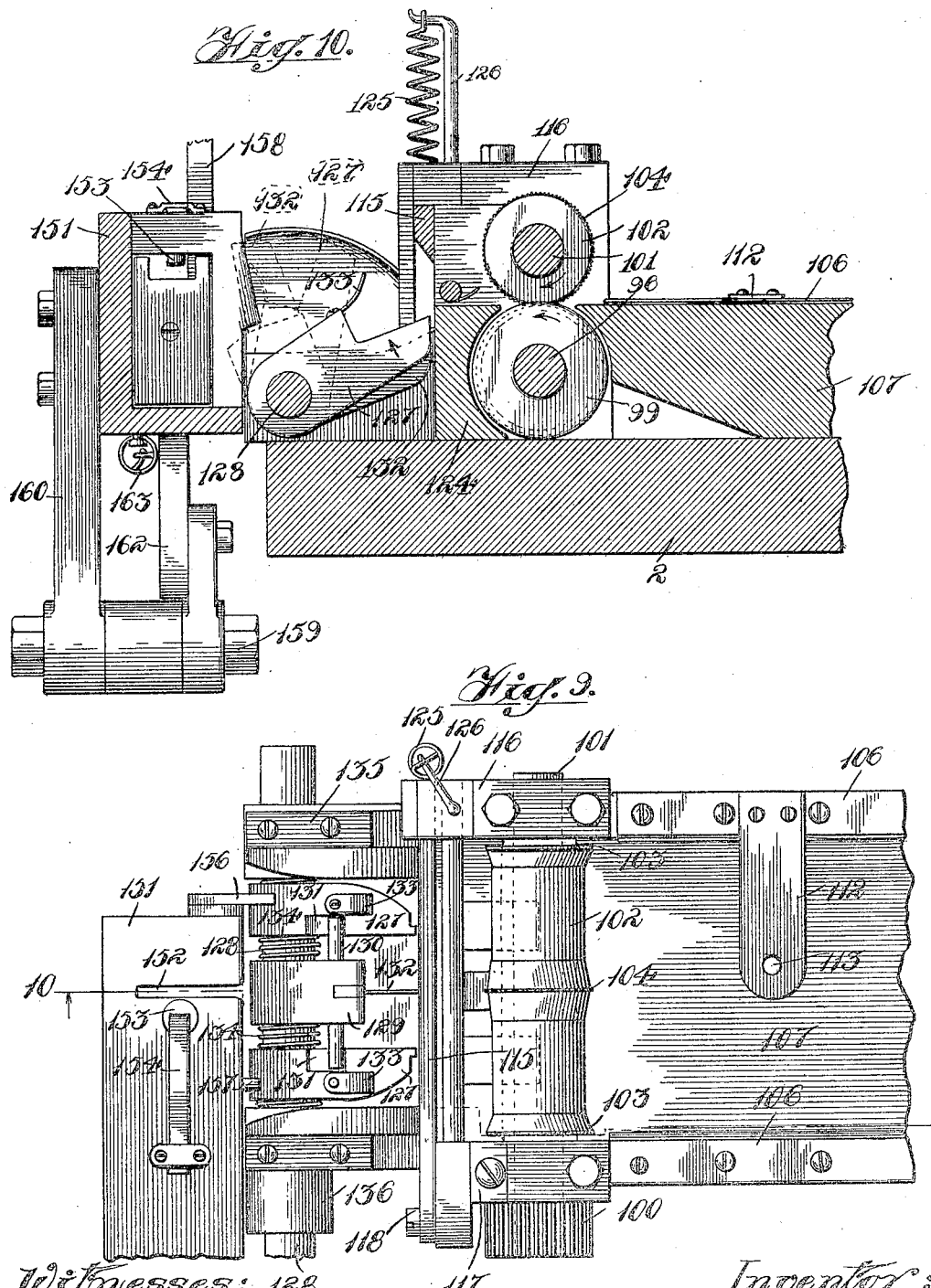

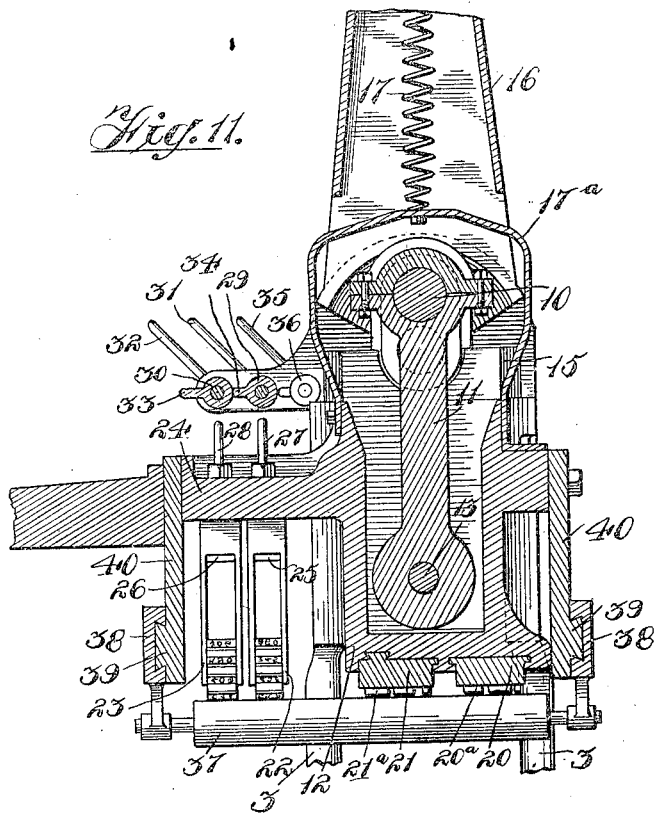
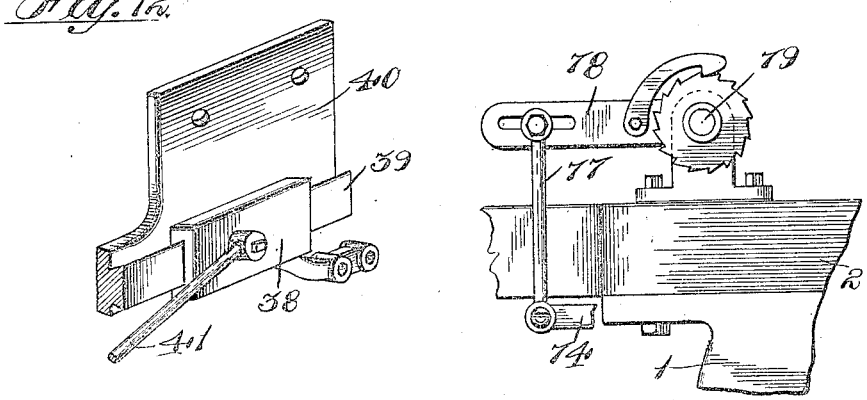

UNITED STATES PATENT OFFICE.

ERNST H. AHLANDER, OF CHICAGO, ILLINOIS, ASSIGNOR TO THE THOMAS WRIGLEY COMPANY, A CORPORATION OF ILLINOIS.

PRINTING-PRESS.

No. 804,181.  Specification of Letters Patent.  Patented Nov. 7, 1905.

Application filed November 28, 1903. Serial No. 182,988.

*To all whom it may concern:*

Be it known that I, ERNST H. AHLANDER, a citizen of the United States, residing at Chicago, in the county of Cook and State of Illinois, have invented a certain new and useful Improvement in Printing-Presses, of which the following is a full, clear, concise, and exact description, reference being had to the accompanying drawings, forming a part of this specification.

My invention relates to printing-presses, and especially to a variety thereof adapted to print stub railway-tickets, milk-tickets, and the like in two or more colors.

The object of the invention is to secure rapidity, efficiency, and economy in machines of this kind.

The printing-press which I show herein for carrying out my invention is adapted to print tickets—such as stub railway-tickets, milk-tickets, and the like—in three different colors. A continuous strip of paper is fed to the press, the paper being of a width equal to the length of two tickets or of a single ticket having two separate parts or portions arranged end to end. A pattern or figure forming the background of the tickets is printed upon the same in one color, and this is called "tinting." The inscription which the tickets are to bear indicating the purpose or purposes for which they are to be used is then printed upon the tickets in another color, and finally the numerals by which the tickets are consecutively numbered are printed in a third color. The corresponding printing operations on the two tickets or the two sections of the single long ticket are performed simultaneously—that is to say, a section of the strip adapted to form two tickets or a single ticket composed of two portions is first tinted, so that the tinting forms the background for both tickets or for both sections of the single ticket. Then the inscriptions for both tickets or for the two sections of the single ticket are simultaneously printed on such tinted section of the strip, and then both the numerals for both tickets or both sections of the single ticket are simultaneously applied thereto. The strip is then cut longitudinally to separate the two tickets formed at its opposite side portions from one another in case two different tickets are made, or it is scored longitudinally to form a line about which the two sections of a single ticket can be folded or bent in case a single wide ticket is being formed. The strip is then cut crosswise, so as to separate the different crosswise sections from one another, and thus form the completed tickets. When two different tickets are made, they are fed into a suitable receptacle, and when single tickets of two sections are made they are folded about the scored line and then fed into a suitable receptacle.

It will be understood that while the machine herein shown, as just stated, is constructed and equipped to prepare tickets or similar articles, as above set forth, its principles of construction and operation can be applied in other or similar manners. For instance, the number of tickets prepared from the continuous strip can be varied, the number of colors used can be changed, these colors can be employed in different ways, and other changes can be made.

In the accompanying drawings, Figure 1 is a front elevation of a machine embodying my invention. Figs. 2 and 3 are elevations of opposite sides of the same. Fig. 4 is a rear elevation. Fig. 5 is a plan view. Fig. 6 is a vertical section taken on line 6 6 in Fig. 3. Fig. 7 is a vertical section taken on line 7 7 in Fig. 1. Fig. 8 is a horizontal section taken on line 8 8 in Fig. 3. Fig. 9 is a plan view of a portion of the machine, and Fig. 10 is a vertical section taken on line 10 10 in Fig. 9. Fig. 11 is a vertical section of another portion of the machine. Figs. 12, 13, 14, and 15 are details of construction, and Figs. 16 and 17 are views of details of a modification.

The machine shown is provided with a frame consisting of legs 1 1 and a flat top or table 2, resting and secured upon said legs. Upon the top 2 are mounted three uprights or standards 3, 4, and 5, which are properly secured to said top, and these standards, by means of suitable bearings, as best shown in Figs. 6 and 11, support a rotary driving-shaft 6, which is the main driving-shaft of the machine. This shaft is conveniently provided with loose and fast pulleys 7 and 8, respectively, and a fly-wheel 9. It is also provided with a crank 10, which operates a pitman 11, while the latter in turn is connected with a vertical reciprocating plunger or cross-head 12 by means of a spindle 13. The plunger 12 is arranged to work in suitable guideways 14 and 15, provided on the uprights 3 and 4, respectively, as best shown in Fig. 6. An elongated case or box 16 is mounted above the plunger 12 and contains a pair of springs 17 17, which are connected with a hood 17ª, secured to the plunger so as to counterbalance the latter. These springs are capable of adjustment by the milled wheel 18 and the adjusting-screw 19. The plunger 12 is provided with two chases 20 and 21, which hold type-forms 20ª and 21ª, respectively. The form 20ª is the form representing the figure or pattern which does the tinting, and the form 21ª is the type which prints the inscription or wording which is to be borne by the tickets. Each of the forms 20ª and 21ª is double—that is, each has two portions, one behind the other, considered with reference to Fig. 11. The chases 20 and 21 are arranged to slide in and out of position in the bottom of the plunger, as will be seen by the construction illustrated in Fig. 11. The chases are provided with handles 20ᵇ and 21ᵇ. Catches 20ᶜ and 21ᶜ are provided to hold the chases normally in position. The plunger 12 also carries, as shown in Fig. 11, a pair of numbering devices 22 and 23, each of which is adapted to print consecutive numbers. These numbering devices are one well-known form of numbering device of this kind and are conveniently mounted on a lateral extension 24 of the plunger. The types of these numbering devices are turned in the usual manner by spring-controlled plungers 25 and 26, whose upper ends or spindles 27 28 extend above the lateral projection 24 on the reciprocating plunger or cross-head 12. Above the spindles 27 28 are cams 29 and 30, adapted to coöperate with said spindles and provided with handles 31 and 32, by which they are turned. When the handles 31 and 32 are thrown down, the projections 33 and 34 on the cams 29 and 30 are thrown downwardly into position immediately above and in alinement with the spindles 27 and 28, so that on the upward movement of the plunger 12 the spindles 27 and 28 will strike against the projections 33 and 34 on said cams, with the result that said spindles will be stopped, and the types of the numbering devices in continuing their upward movement will strike said plungers and be turned thereby. When the handles 31 and 32 are in their elevated positions, as shown in Fig. 11, the projections 33 and 34 on the cams 29 and 30 will be thrown out of the way of the spindles 27 and 28, so that the latter rise and do not turn the types of the numbering devices. A third handle 35, with a corresponding cam 36, is shown for another numbering device, should it be desired to add the same. The numbering devices 22 and 23 are located out of alinement with one another, both sidewise, as shown in Fig. 11, and in a front-to-back manner with reference to said figure.

As an arrangement for inking the printing devices carried by the reciprocating cross head or plunger 12 a pair of inking-rollers 37 37 are arranged for reciprocation across the bottom of the plunger, so that said rollers will ink the type-forms 20ª and 21ª and the types of the numbering devices 22 and 23. As an arrangement for carrying said rollers 37 37 their opposite ends are mounted in slides 38 38, Figs. 11 and 12, which are arranged to travel from side to side of the plunger on guideways or slideways 39 39, conveniently formed as parts of plates 40 40, secured to the front and back faces of the cross-head 12. The slides 38 38 are pivotally connected with links 41 41, Figs. 4 and 6, which are in turn connected with arms 42 42. The arms 42 42 are carried by a rock-shaft 43, which is mounted in a bar 43ª, Figs. 3 and 5, supported by a frame 44, secured to the upright or standard 4. The shaft 43 carries a toothed segment 45, which meshes with a toothed segment 46, mounted on a rock-shaft 47, which is also supported by the frame 44. The shaft 47 carries an arm 48, which is pivotally connected with a cross-head 49, having a pivotal connection with a yoke 50, which is in turn pivotally connected with an eccentric-strap 51, working on an eccentric 52 on a collar 53, secured to the rotary shaft 6. Thus it will be seen that as the shaft 6 rotates the eccentric 52 will cause the arm 48 to rock, thereby by means of the toothed segments 45 and 46 the arms 42 will be swung crosswise of the machine, and the slides 38 38, carrying the inking-rollers 37 37, will be reciprocated from side to side, so as to ink the type-forms and numbering devices. This mechanism for reciprocating the inking-rollers 37 37 is so arranged as to cause said rollers to pass under the reciprocating plunger 12 to perform the inking operation at a time when said plunger is performing the latter portion of its upstroke and the early portion of its downstroke.

An inking apparatus for inking the rollers 37 37 is arranged at one side of the machine. This consists of an inking-fountain 54, which is arranged on one side of the top or table 2, as shown in Figs. 6 and 8, and provided with three compartments 55, 56, and 57, which contain inks of different colors. This ink-fountain 54 is provided with a roller 58, which is made of three sections 59, 60, and 61 for the three different-colored inks. A composition ink-roller 62 is located at one side of the fountain-roller 58, and a pair of rollers 63 and 64 are located to one side of the roller 62. The rollers 62, 63, and 64 are all made in three sections, as is the roller 58. The roller 64 is continuously turned by a gear connection with the main driving-shaft 6, which connection consists of a miter-wheel 65 on the shaft 6 and a miter-wheel 66 on the spindle 67 of the roller 64 and a shaft 68, having beveled wheels 69 and 70, Figs. 3 and 4, meshing with the miter-wheels 65 and 66, respectively. The roller 63 is turned by the roller 64. The roller 62 is swung back and forth, so as to make contact first with the roller 63 and then with the roller 61, and the roller 61 is intermittently turned. To such end the roller 62 is mounted on arms 71 71, Figs. 2 and 6, which are carried by a rock-shaft 72, journaled in bearings 73 73, suspended from the top 2. A lever 74 is mounted on the shaft 72 and is pivotally connected with a link 75, having an eccentric-strap which works on an eccentric 76 on the spindle 67. The lever 74 is connected at its opposite end with a link 77, Fig. 13, which is connected with an arm 78, having a ratchet connection with the spindle 79 of the roller 58. Thus as the shaft 67 of the roller 64 rotates the lever 74 will be swung up and down by the eccentric 76, so as to swing the roller 62 back and forth between the rollers 63 and 58, and at the same time the ratchet mechanism connected with the roller 58 and operated by the lever 74 causes the intermittent turning or step-by-step motion on the part of said roller 58. The inking-rollers 37 37, it is understood, are reciprocated so as to come into contact with the roller 64 at the end of each stroke, and they become inked thereby. The inking-fountain and arrangement of associated rollers distributes the ink evenly on the roller 64, thereby insuring an even inking of the rollers 37.

A reel 80 for a roll 81 of paper is supported on a suitable bracket-arm 82, Figs. 2 and 6, and the strip of paper is extended up from this reel to and over a roller 83, Figs. 2 and 14. From this roller the paper passes to and between a pair of feed-rollers 84 84, Figs. 4 and 5, mounted in brackets 85 85, which also support the roller 83. The rollers 84 84 are provided with gears 86 87, and the spindle 88, on which the latter is mounted, is extended to one side, as shown in Fig. 5, and mounted at its outer end in a bearing 89 on the top 2. The spindle 88 is intermittently turned by a ratchet connection (shown in Fig. 15) with a reciprocating link 90. The latter extends upwardly and forwardly, as shown in Figs. 5 and 7, and is pivotally connected at its upper end with an arm 91 on an eccentric-strap 92, applied to an eccentric 93 on the rotary shaft 6, Fig. 6. The eccentric-strap 92 is also connected with another reciprocating link 94, which extends forwardly and downwardly and is connected to a ratchet-block 95 on a shaft 96, Figs. 8 and 10, mounted in bearings 97 and 98 on the top 2. The shaft 96 is provided with a feed-roller 99, Fig. 10, and also with a gear-wheel (not shown) meshing with a gear 100, Fig. 9, on a shaft 101, carrying a roller 102, having peripheral enlargements 103 103 at its ends and a perforating-wheel 104 midway between its ends. The peripheral enlargements 103 103 coöperate with the feed-roller 99. By such arrangement the reciprocation of the links or arms 90 and 94 by the eccentric 93 causes the intermittent rotation of the shafts 88 and 96, and thus causes the intermittent rotation of the feed-rollers 84 84 and of the feed-roller 99 and feed and perforating roller 102. The upstroke of the link 90 turns the shaft 88 so that the feed-rollers 84 84 are turned intermittently in the direction indicated by the arrows in Fig. 14. The downstroke of the link 94 performs the turning of the shaft 96, so that the rollers 99 and 102 are turned in the direction indicated in Fig. 10.

A bed 107, Fig. 8, rests and is secured upon the top 2 between the two sets of feed-rollers heretofore described. This bed is provided with side guide-strips 106 106. A cross retaining-strip 108 is secured to said guide-strips 106 106 and extended between the same near their rear ends, and a plate 109 is secured in position in advance of the strip 108, and another plate 110 is similarly secured in advance of the plate 109. This plate 110 has four apertures 111 111 111$^a$ 111$^a$, which are located substantially in alinement with the two smaller sections of the inking-rollers 61, 62, 63, and 64, as shown in Fig. 8. A small strip 112, having an aperture 113, is secured to one of the guide-strips 106. The plate 109 is provided with a spring-catch 113$^a$, which has a projection extending down through said plate.

A cutting device for cutting off sections of the paper strip is located in front of the rollers 99 and 102. This cutting device comprises a cutting blade or knife 115, Fig. 10, which is arranged for vertical reciprocation in a slot provided in the blocks or bearings 116 and 117 for said rollers. This knife 115 is pivoted at one side by a pivot or pin 118, Fig. 9, and is pivotally connected with one arm 119 of a bell-crank lever, which is pivoted at 120 to the standard 4, Fig. 1. The other arm 121 of said bell-crank is provided with a wheel 122 and extends downwardly, so that said wheel is adapted to come into contact with a cam 123, carried by the plunger or cross-head 12. A spring 125, Figs. 1 and 10, is attached to the outer or free end of the swinging knife 115 and is connected at its upper end to the upper end of a post 126, secured to the block 116. By such arrangement the plunger 12 by descending causes the cam 123 to strike the wheel 122, and thereby swing the bell-crank carrying said wheel so as to throw the blade or knife 115 downwardly across the edge of a cutting-block 124, mounted in front of the roller 99, Fig. 10. The cutting-blade is automatically elevated upon the upstroke of the cross-head 12 by the spring 125.

A folding device for folding a single ticket composed of two parts is located in advance of the cutting-blade 115. This folding device comprises a pair of swinging blocks 127 127, mounted loosely on a shaft 128, Figs. 9 and 10. An arm 129 is also mounted on the shaft 128; but the arm 129 is fast on said shaft instead of being loose thereon, as are said blocks. The arm 129 is provided with a pin 130, projecting on both of its sides, as shown in Fig. 9, and this pin is adapted to fit into recesses 131 131 in said blocks 127 127. The arm 129 is also provided with a centrally-arranged blade 132, which projects outwardly from the end of said arm. The blocks 127 127 are provided with upturned spring-clips 133, as well shown in Fig. 10. Springs 134 134 are mounted upon and secured to the shaft 128 and also secured to the loose blocks 127 127 and are so arranged as to tend to always swing said blocks upwardly and forwardly—that is, in the direction indicated by the arrow in Fig. 10. The shaft 128, however, is normally in such position as to hold the arm 129 downwardly and by means of the pin 130 to hold said blocks 127 127 also in their downward positions. The shaft 128 is extended to one side of the machine, as well shown in Fig. 5, and is mounted in bearings 135, 136, and 137, all secured to the top 2. This shaft 128 is provided at its outer end with a pinion 138, Fig. 3, which meshes with a toothed segment 139, mounted on a short shaft 140, supported by the front leg 1. A link 141 is pivotally connected with the toothed segment 139, and this link is in turn pivotally connected with one arm 142 of a bell-crank, which is pivotally supported on a shaft 143, mounted in a bearing located below and formed as a part of the bearing 43ª. The other arm 144 of said crank-arm is provided with a roller 145, adapted to work upon a cam 146, mounted on the rotary shaft 6. A sliding shaft 147 is also pivotally connected with toothed segment 139 and is provided with a spring 148 and also with a pin 149, resting against one end of said spring. Said shaft 147 is mounted in a hanger 150, against which the other end of said spring rests. A tubular box 151, Figs. 9 and 10, is mounted upon the front edge portion of the table 2, as shown in Figs. 3, 5, 9, and 10. The interior of this box 151 has a cross-section substantially the size and shape of one of the tickets to be made by the machine or of the two sections composing the single ticket. This box has a transverse slot 152, Fig. 9, in its top adapted to receive the blade 132 on the arm 129. A vertically-movable pin 153 is arranged in the top of the box, and a strap-spring 154 is secured to the outside of the box and has one end resting on the pin 153. A removable extension 155 of the box 151 is arranged at one end of the latter, as shown in Fig. 5. The extension 155 is of the same interior dimensions as the box 151, the extension 155 being desirably made of wood. Stops 156 and 157 are secured to the box 151 directly in front of the swinging blocks 127 127.

The folding arrangement thus set forth operates as follows: The cam 146, Fig. 3, by operating on the wheel 145 causes the toothed segment 139 to rock the shaft 128, Fig. 5, and thereby swing the arm 129 from its rear position, as shown in Fig. 9 and in full lines in Fig. 10, to a forward position, as indicated in dotted lines in Fig. 10. The swinging blocks 127 127 are caused to swing up and forwardly substantially with the arm 129 by the springs 134 134. When these blocks 127 127 strike against the stops 156 157, however, they are stopped in their swinging movement, while the arm 129 continues until the blade 132 passes into the slot 152, whereupon the shaft 128 is rocked into the opposite direction, with the result that the arm 129 is swung backwardly to its original position, engaging the blocks 127 127 and swinging them backwardly with it.

A device for feeding the tickets along the box 151 and into the extension or receptacle 155 is arranged at the front of the machine. This device comprises a swinging arm 158, pivoted at 159 to the lower end of a hanger or bracket 160, Figs. 1 and 10, secured to the box 151. The arm 158 is provided at its upper end with a roller 161 and carries a feeding or pressing device 162, adapted to enter the end of the box 151. A spring 163 is secured to said arm 158 and also to the lower wall of the box 151, so as to tend to draw said arm always toward said box. A cam 164 is secured to the plunger or cross-head 12. By such arrangement the cam 164 in reciprocating with the plunger 12 strikes against the roll 161 at each downstroke of said plunger, and thereby throws or swings the arm 158 outwardly to one side, thereby withdrawing the feeding or presser plate 162 out of the end of the box 151. When the cam 164 rises, the spring 163 draws the arm 158 inwardly, thereby causing the feeding-plate 162 to enter and move lengthwise in the box 151.

The machine as above set forth operates as follows: To prepare for the running of the machine, the strip of paper is first passed between the feed-rollers 84 84 and then along over the bed 107 and under and between the guide-strips 106 106, then under the plates 108, 109, 110, and 112, and thence is passed between the rollers 99 and 102. The inking apparatus is also properly provided with inks of three different colors, and the same is distributed by such inking apparatus to the inking-rollers 37 37, so that the latter are in condition to ink the type-forms and numbering devices carried by the reciprocating plunger 12. The machine is then run with the result that the continuous strip of paper 81 is advanced intermittently by the two sets of feed-rollers 84 84 and 99 and 102. As a preferred arrangement a length of paper greater than the distance between the two sets of feed-rollers is extended between the same, so that the paper puckers or loops upwardly between the strip 108 and the rollers 84 84. In this way the front feed-rollers 102 and 99 merely advance the length of the paper between them and the rollers 84 84, and thus they are relieved of the strain of drawing the paper from the reel. Between each intermittent advancement of the paper by these two sets of feed-rollers the reciprocating plunger descends and prints upon four different sections of said strip. The first section, lying below the apertures 111 111 in the plate 110, is tinted by the tinting-form $20^a$, the second section, lying below the apertures $111^a$ $111^a$, is printed with the inscription of the type-form $21^a$, and two advance sections are printed by the numbering devices 22 and 23, one on one side portion and the other on the other side portion. Thus it will be seen that, considering a single section of the continuous strip, it will be first tinted while lying under the apertures 111 111, then printed while under the apertures $111^a$ $111^a$, and then one side of it will be numbered by the numbering device 22, and then the other side will be numbered by the numbering device 23. Thus as the paper strip advances it will be converted by the tinting, printing, and numbering into either two tickets or a single ticket having two sections. Between each reciprocation of the plunger the tinting and type forms and the numbering devices are properly inked by the inking-rollers 37 37, which are advanced across the plunger and back again after the plunger has commenced to rise and while it is descending. The plate 110 and the strip 112 hold the paper strip against rising when the printing devices leave it, and the pin 113 on the plate 109 exercises a slight drag on the paper strip, thereby holding it firm and tight. The paper strip on being advanced and passing between the rollers 99 and 102 is perforated by the perforating-wheel 104, thereby creating a line of perforation between the two sections or parts of single tickets. As the paper strip advances it is cut by the cutting-blade 115, so as to cut off the different sections which have been properly printed to form the tickets. These sections, now in the form of tickets, then pass upon the free ends of the swinging blocks 127 127, being properly guided and prevented from passing the same by the clips 133 133. The blocks 127 127 thereupon swing upwardly and forwardly until they are stopped, after which the arm 129 by its continued movement causes the blade 132 to fold the tickets about their lines of scoriation and to pass them in this folded condition into the box 151 through the slot 152. The feeding device 162 then presses each folded ticket past the pin 153, where it stands and rests against previously-prepared tickets. Thus a quantity of tickets properly prepared and folded are collected into the box 151 and receptacle 155 and are taken from the latter from time to time by removing the same and emptying it or by merely pushing the tickets out of said receptacle by the slot in the front side thereof.

Where instead of a single double ticket with two different sections separated by perforated lines it is desired to prepare two separate tickets which would pass through the machine end to end, the perforating-wheel 104 is replaced by a cutting-wheel $104^a$, Figs. 16 and 17. This wheel instead of perforating the continuous strip of paper severs the same. In such case the folding apparatus can be simply removed and the completed tickets allowed to fall into a suitable chute or receptacle arranged to receive them.

It will be seen that the machine as thus set forth is capable of preparing a plurality of tickets instead of a single ticket, and thus the speed of production of tickets or like articles is greatly increased. It will also be seen that by feeding a continuous strip to the machine the feeding mechanism is simplified, for it is unnecessary to have mechanism for holding a stack of prepared tickets and of feeding the same one by one to be printed. By such arrangement also the amount of cutting required is less. It will also be seen that the entire operation of preparing the tickets and delivering them either cut or folded is simple and effective and economical.

It will be seen that the machine is capable of use in many and varied ways in addition to that hereinabove described. The type-forms and numbering devices can be varied and rearranged so as to print various forms of tickets, either alike or unlike, and also to print other similar articles. In case it is desired to punch a hole in the tickets a punch can be added to the plunger 12 and arranged to pass through the aperture 113 in the strip 112. Other modifications and arrangements for various purposes can be made. It will also be seen that the principle of the invention can be applied in ways other than that herein set forth.

I consider that the particular devices and mechanisms herein shown and described can be varied without departing from the spirit of my invention, and hence do not wish to be understood as limiting myself to them.

What I claim as my invention is—

1. The combination of a bodily-reciprocating plunger provided with printing devices, inking-rollers carried by sliding members, slideways on said plunger for said sliding members, whereby the rollers can be slid back and forth across the printing devices, and means for reciprocating said sliding members.

2. The combination of a bodily-reciprocating plunger, having its lower face provided with printing devices, a set of inking-rollers, slides carrying said inking-rollers, slideways on said printing member whereby said slides can be slid back and forth across the face of the plunger so as to ink said printing devices, and means for reciprocating said slides during the reciprocation of said plunger.

3. The combination of a bodily-reciprocating plunger, a rotary shaft provided with a crank for reciprocating said plunger, printing devices carried by said plunger, a set of inking-rollers, slides carrying said rollers, slideways on said plunger whereby said slides can be reciprocated back and forth across the face of said plunger so as to ink the printing devices thereon, and power-transmitting connection between said rotary shaft and said slides, whereby the latter are reciprocated during the reciprocation of the plunger.

4. The combination of a reciprocating printing-plunger, a rotary driving-shaft provided with means for reciprocating said plunger, slides carrying inking-rollers, slideways on said printing-plunger, along which said slides can travel, links connected with said slides, arms connected with said links, a rock-shaft carrying said arms, gearing for turning said rock-shaft, and mechanism between said rotary driving-shaft and said gearing for actuating latter, substantially as described.

5. The combination with a reciprocating printing member and means for reciprocating the same, of slides provided with inking-rollers, slideways carried by said printing member whereby said slides can be reciprocated across the face of said printing member, links connected with said slides, arms connected with said links, a rock-shaft carrying said arms, toothed segments 45 and 46 whereof the segment 45 is carried by said rock-shaft, an arm 48 carried by the shaft 47 on which the segment 46 is mounted, a cross-head connected with the arm 48, and means for reciprocating said cross-head.

6. The combination of a reciprocating plunger provided with printing devices, a rotary shaft 6 having a crank for reciprocating said plunger, slideways 39, 39 carried by said plunger, slides 38, 38 arranged to slide on said slideways 39, 39, links 41, 41 connected with said slide, arms 42, 42 connected with said links 41, 41 and carried by a rock-shaft 43, toothed segments 45 and 46 whereof the former is on the shaft 43 and the latter is on the shaft 47, an arm 48 carried by the shaft 47, a cross-head 49 pivotally connected with the arm 48, and an eccentric 52 carried by the rotary shaft 6 and arranged to operate the cross-head 49, substantially as described.

7. The combination with a bodily-reciprocating printing member and means for reciprocating the same, of inking devices carried by the printing member, means for reciprocating said inking devices relatively to said printing member, and an ink-fountain apparatus arranged to coöperate with said inking devices.

8. The combination with a bodily-reciprocating printing member, of inking-rollers carried thereby, means for reciprocating said inking-rollers relatively to said member, an ink-fountain, and rollers associated therewith, said rollers being adapted to coöperate with said inking-rollers, substantially as described.

9. The combination with means for feeding a continuous strip, of means for perforating said strip longitudinally, means for cutting sections of said strip therefrom, a bed and reciprocating printing-plunger for printing on said sections, and means for folding said sections about said line of perforation.

10. The combination with means for feeding a continuous strip, of means for printing upon successive sections thereof, means for perforating said strip longitudinally, means for cutting said sections from the strip, and means for folding said sections about said line of perforation.

11. The combination of a bodily-reciprocating printing member provided with a plurality of printing-forms arranged side by side, inking-rollers for inking said forms, slides carrying said rollers, slideways on the printing member running in a direction from one form to another, and means for shifting said slides back and forth on said slideways.

12. The combination with a reciprocating plunger of a plurality of printing devices arranged side by side, inking-rollers for inking said printing devices, said rollers being made in sections, and the different sections being adapted to ink the different devices, slides carrying said rollers, and arranged to travel back and forth on slideways provided on the printing-plunger, means for reciprocating the slides back and forth relatively to the printing-plunger, and inking devices adapted to apply different-colored inks to the different sections of said rollers, and arranged to coöperate with said rollers as the latter are reciprocated by the printing-plunger, and reciprocated relatively to said plunger, substantially as described.

13. The combination of a reciprocating printing-plunger provided with a plurality of printing devices and constructed with slideways, inking-rollers made in sections and carried by slides adapted to travel along said slideways, the different sections of said rollers being adapted to ink the different printing devices when reciprocated by said slides, means for reciprocating said slides relatively to the printing-plunger, an inking-roller arranged to ink said inking-rollers at one end of the path of travel of the latter, and an ink-fountain and supply-rollers adapted to apply inks of different colors to said inking-roller, substantially as described.

14. The combination with the reciprocating plunger and the feed-rollers 84, 84 and 99 and 102, of a rotary shaft 6 operating said plunger, an eccentric 93 on said shaft, links 90 and 94 connected with said eccentric, ratchet mechanisms at the ends of said links, and power-transmitting connection between said ratchet mechanisms and said sets of rollers.

15. The combination with the printing mechanism of a folding device comprising a folding-blade, an abutment against which the article to be folded is moved, said abutment having a slot to accommodate said folding-blade, and means for moving the article to be folded to said abutment, said means having an elastic mounting permitting it to be stopped by the abutment, substantially as described.

16. The combination with the printing mechanism of a folding device comprising a folding-blade, swinging members arranged on opposite sides of the folding-blade, spring means tending to swing said swinging members, the folding-blade being provided with means for holding said members in restraint, means for swinging the folding-blade, and an abutment having an aperture adapted to receive the folding-blade, whereby when the folding-blade is swung toward said abutment the swinging members on opposite sides thereof move with the folding-blade to move the article to be folded to said abutment, substantially as described.

17. In a machine of the class specified, the combination with the printing mechanism, of a folding device comprising a pair of swinging blocks, a folding-blade located between said blocks, means for swinging both the blocks and the blade, means for restraining the swinging movement of the blocks, and a slot adapted to receive said blade and power-transmitting connection between the printing mechanism and the folding device.

18. In a machine of the class specified, the combination with the printing mechanism, of a folding device comprising a pair of swinging blocks, a shaft on which said blocks are loosely mounted, spring means on said shaft connected with said blocks, tending to cause the blocks to swing when the shaft turns, an arm secured to the shaft and provided with a blade, a receptacle provided with a slot adapted to receive the blade, and stops for engaging and supporting the blocks before the blade enters said slot and power-transmitting connection between the printing mechanism and the folding device.

19. In a machine of the class specified, the combination with a printing-plunger and a bed, of a folding device comprising a rock-shaft 128, blocks 127, 127 loosely mounted on the shaft 128 and located to receive the printed articles coming from said bed, springs 134, 134 connecting the shaft and blocks, an arm 129 secured to the shaft 128 and provided with a folding-blade 132, a pin 130 carried by the arm 129 and adapted to engage the blocks 127, 127, a receptacle 151 provided with a slot 152 adapted to receive the folding-blade 132, stops 156 and 157 arranged to engage the blocks 127, 127, and means for rocking the shaft 128.

20. In a machine of the class specified, the combination with a printing-plunger and bed of a shaft 128, blocks 127, 127 loosely mounted thereon and located to receive printed articles from said bed, springs 134, 134 connecting the shaft with said blocks, an arm 129 secured to the shaft 128 and provided with a blade 132, a pin 130 carried by the arm 129 and adapted to engage the blocks 127, 127, a receptacle 151 having a slot 152 adapted to receive the blade 132, stops 156 and 157 arranged to engage the blocks 127, 127, a pinion 138 on the shaft 128, a toothed segment 139 engaging the pinion 138, a link 147 pivotally connected with the toothed segment 139, a bell-crank having one arm 142 connected with the link 141 and its other arm 144 provided with a roller 145, an eccentric 146, a rotary shaft 6 carrying said eccentric, and a sliding shaft 147 provided with a spring 148 for retracting the toothed segment 139.

21. The combination with the printing mechanism of a cutting device consisting of a reciprocating cutting-blade and a coöperating cutting edge, a folding device comprising swinging blocks having their free ends located normally at substantially the cutting edge of said coöperating cutting member, a swinging arm provided with a folding-blade, means for swinging said swinging blocks, and means whereby the folding-blade performs a folding operation.

22. The combination with a printing-plunger of a receptacle 151, a feeding device comprising a swinging arm 158, pivoted at 159 and carrying a feeding-plate 162 and also a roller 161, a cam 164, carried by the printing-plunger, mechanism for reciprocating said plunger, and a bed coöperating with said printing-plunger, substantially as described.

23. The combination with the printing mechanism, of folding mechanism comprising a swinging folding-blade adapted and arranged to receive the article to be folded, swinging members located on opposite sides of said folding-blade and also arranged to receive the article to be folded, and a coöperating folding member having a slot to receive said folding-blade, substantially as described.

24. The combination with the printing mechanism, of a cutting device for cutting the printed strip into sections, a swinging folding-blade located and arranged to receive the cut sections, in combination with a pair of coöperating swinging members also located to receive the cut sections, and a coöperating folding member having a slot adapted to receive the folding-blade, substantially as described.

25. The combination with the printing mechanism, of folding mechanism comprising a swinging folding-blade located and arranged to receive the article to be folded, a pair of spring-controlled swinging blocks located on opposite sides of said swinging blade, and a coöperating folding member having a slot adapted to receive said folding-blade, substantially as described.

26. The combination with the printing mechanism, of folding mechanism comprising a swinging folding-blade located and arranged to receive the article to be folded, a pair of spring-controlled swinging blocks located on opposite sides of said swinging blade, and a receptacle for the folded articles, having a slot adapted to receive the folding-blade, whereby the articles are folded on entering said receptacle, substantially as described.

27. The combination with the printing mechanism, of folding mechanism comprising a movable folding-blade combined with a pair of spring-controlled movable supports located on opposite sides of the folding-blade, said blade and supports being adapted and arranged to receive the article to be folded, and a receptacle for the folded articles, having an aperture adapted to receive said blade, the said supports being engaged and stopped by said receptacle when the folding-blade enters the same, substantially as described.

In witness whereof I hereunto subscribe my name this 24th day of November, A. D. 1903.

ERNST H. AHLANDER.

Witnesses:
A. MILLER BELFIELD,
I. C. LEE.